Jan. 27, 1970 W. S. MICHEL 3,492,434

DIAL PULSING SIGNALING SYSTEM UTILIZING CODED PULSE GROUP TRANSMISSION OVER A COMMON SIGNALLING CHANNEL

Filed Dec. 23, 1966 4 Sheets-Sheet 1

INVENTOR
W. S. MICHEL
BY R. B. Ardis
ATTORNEY

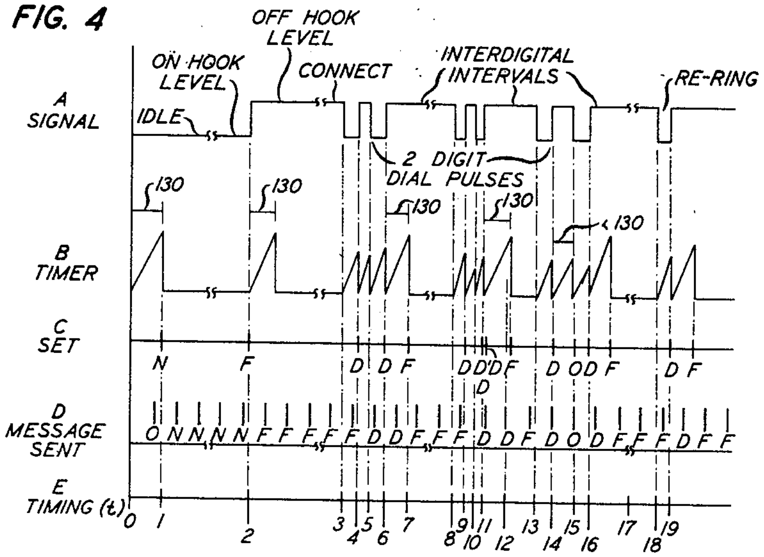
FIG. 4
FIG. 5
| SIGNALING CONDITION | SYMBOL | CODE |
|---|---|---|
| ON HOOK | N | 11 |
| OFF HOOK | F | 01 |
| DIAL PULSE | D | 10 |
| NO ACTION | - | 00 |
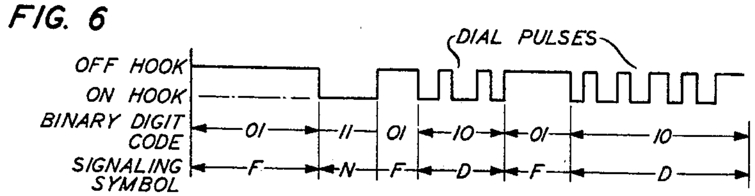
FIG. 6
FIG. 7
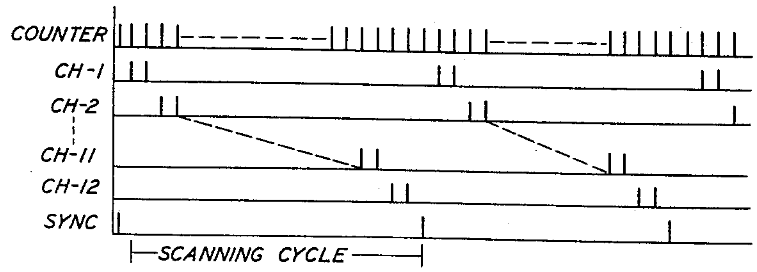

United States Patent Office 3,492,434
Patented Jan. 27, 1970

3,492,434

DIAL PULSING SIGNALING SYSTEM UTILIZING CODED PULSE GROUP TRANSMISSION OVER A COMMON SIGNALING CHANNEL

Walter S. Michel, Rumson, N.J., assignor to Bell Telephone Laboratories, Incorporated, Murray Hill and Berkeley Heights, N.J., a corporation of New York Filed Dec. 23, 1966, Ser. No. 604,363
Int. Cl. H04m 3/22
U.S. Cl. 179—18 9 Claims

ABSTRACT OF THE DISCLOSURE

In a multichannel D-C dial pulsing system the D-C signaling information for each channel is transformed at the transmit terminal into coded binary pulse groups. A scanner samples each channel periodically to allow the transmission of the coded pulse groups over a common signaling channel. At the receiving terminal the coded pulse groups are directed to the proper receiving channel to be decoded and to be retransformed into D-C signaling information to perform the required signaling information.

BACKGROUND OF THE INVENTION

This invention relates generally to telephone transmission systems and, more particularly, to multichannel telephone transmission systems which employ dial pulsing signaling, and in which the signaling information for a number of channel is transformed into coded pulse groups to be transmitted over a common signaling channel.

In a telephone transmission system which links central office terminals and which employs dial pulsing signaling at the central office terminals, communications between these terminals may take place over metallic-pair voice-frequency telephone transmission lines or over a multichannel telephone carrier system, which takes the place of a number of metallic pairs. For each metallic pair or for each of the channels of the multichannel carrier system voice messages and signaling information must be transmitted between the terminals.

When a number of metallic-pair voice-frequency telephone transmission lines are replaced by a single multichannel carrier system, each one of the channels, if it is to be fully compatible with the associated switching equipment, must be capable not only of carrying the same message information as the voice pair it replaces, but also of passing the same form of signaling information. It should, in other words, accept both voice messages and signaling information in the form in which they would have been accepted if they were to be impressed upon a metallic pair, and it should reproduce both in substantially their original form at the receiving end of the line. Although a number of techniques are known for transmitting signaling information over respective carrier channels between central offices, a system employing a sequence of single frequency (SF) tones has been among those most widely used.

In a typical 12-channel interoffice telephone system, for instance, which employs D-C signaling at each terminating central office terminal, and which uses SF signaling between the terminals, the D-C dial pulsing signals for each channel are transformed at the transmitting end into SF tones to be transmitted over the respective channel. That is, the standard signaling conditions of off-hook, on-hook, dial pulse, and re-ring are transmitted in the form of single frequency (SF) tones over the particular channel with which the signal is associated. At the receiving end these SF tones are then converted again to D-C dial pulsing signals to convey the required signaling information.

Such a signaling system, however, is limited to two states; that is, the tone may be either on or off, so that the amount of information that can be conveyed by such signaling method is inherently limited. Additional information may be transmitted by attaching weight to the duration of the one and by considering its occurrence in time with respect to the remainder of the signal. Such added signaling means are found to be complex, however, while still extremely limited in the amount of additional intelligence that they are able to convey.

The principal object of the present invention is to provide for simple and reliable signaling between central office terminals in a multichannel telephone transmission system which employs dial pulsing signaling at the terminals.

Still another object of the invention is to provide in a multichannel telephone transmission system for a signaling system which may be readily expanded to accommodate more complex signaling requirements.

SUMMARY OF THE INVENTION

In accordance with the invention, the dial pulsing signaling information for each of the channels of a typical multichannel telephone transmission system is transformed into coded pulse groups; each channel is then periodically sampled by a scanner to allow the transmission of the respective coded pulse group from one central office terminal over a common signaling channel to the receiving central office terminal, and at the receiving terminal each coded pulse group is directed to the receiving channel which corresponds to the respective transmit channel, where the coded pulse groups are then decoded and reconstructed into dial pulsing signals to perform the required signaling functions.

More specifically, in one embodiment of the invention two-binary-digit coded pulse groups are assigned for each of the standard signaling conditions of dial pulse, off-hook, and on-hook of the dial pulsing signaling system. The instantaneous signaling condition of each channel is then transformed into a corresponding coded pulse group, and the scanner samples the individual channels periodically to transmit one two-binary-digit coded pulse group for each channel once every sampling period.

In order to generate the coded pulse groups, the standard D-C impulses resulting from specific dial pulsing signaling actions in a particular channel are applied to a coding network. The basic dial pulsing signals that are applied ot the coding network consist of on-hook and off-hook voltage levels. The on-hook voltage level, corresponding to a telephone receiver on-hook condition, is one particular voltage level, and the off-hook voltage level, corresponding to a telephone receiver off-hook condition during interdigital intervals and during the period when a connection has been completed, is another different voltage level. Dial pulses, on the other hand, are a combination of rapidly alternating, time related on-hook and off-hook signal levels. As a result, dial pulses may be distinguished from normal off-hook or on-hook signaling by considering the time relationship between successive signal level changes. The coding network therefore includes a timing arrangement to examine the time relationship between successive changes in D-C level. Depending upon the particular time relationship thus determined, the specific signaling information is further operated on and allowed to progress through the coding network to enable one of three bistable output devices, where the enabling of a particular output device corresponds to an on-hook, off-hook, or dial pulse condition, respectively, of the signaling input. The coding network is thus able to differentiate accurately between the various signaling conditions conveyed by the input signal to enable one of the output devices of each channel at a time to reflect the signaling condition of that channel at any particular instant.

A common scanner next applies periodically a first, second, or both, of two consecutive ring counter output pulses ot the output devices of each channel. Of a respective channel, however, only the particular output device that has been enabled allows the transmission of the specific pulses applied to it by the scanner, thereby generating and transmitting over the common signaling channel a two-binary-digit coded pulse group per channel once every scanning period.

At the receiving terminal, in turn, each coded pulse group is directed to the receiving channel corresponding to the respective transmit channel. The respective pulse groups are decoded at the receiving terminal and are retransformed into signaling levels to perform the proper signaling functions that correspond to the signaling condition of the transmit channel at the time of scanning.

An outstanding advantage of the present invention is the low bit rate requirement which allows all of the signaling information of a typical multichannel interoffice system to be transmitted beween central office terminals over a common, low bit capacity channel, where such channel may be conveniently provided for within the telephone transmission system by allocating either a voice channel or a narrow band of frequencies not otherwise used.

A major advantage of the invention over SF signaling is the ease with which it may be adapted to accommodate additional signaling requirements. Present day trends are to require more and more signaling information. Because SF signaling is limited to the two-state transmission mode, the amount of information that can be transmitted by SF signaling is inherently limited. The signaling system of the present invention, on the other hand, is inherently suited to have its signaling capacity increased to comply with newly arising signaling requirements. Such increase may be accommodated by simply increasing either the number of coded pulse groups or the number of binary digits per coded pulse group and by raising the common signaling channel bit capacity correspondingly in order to accommodate the resulting increase in bit rate.

Another feature of the invention is the manner in which re-ring signals are processed. As a result of the timing arrangement within the coding network, the re-ring signal simply causes the transmission of a dial pulse coded pulse group and, therefore, generates a standard output pulse at the receiving end. Because of its occurrence in time relative to other signaling information, however, such pulse is inherently recognized at the receiving station as re-ring pulse.

A further significant feature of the invention which helps to reduce the required intelligence content of the coded pulse groups, is the automatic termination of each pulse at the receiving end without requiring the sending of pulse termination commands for each dial pulse.

DESCRIPTION OF THE DRAWINGS

FIG. 4 illustrates the generation of coded pulse groups for the embodiment of the invention shown in FIGS. 1 through 3;

FIG. 5 shows a tabulation of one specific binary code that may be used in the embodiment of the invention;

FIG. 6 illustrates a particular dialing signal together with the coded pulse groups and signaling symbols; and FIG. 7 illustrates the pulse distribution of the ring counter output pulses for the embodiment of the invention shown in FIG. 2.

DETAILED DESCRIPTION

Figure 1:
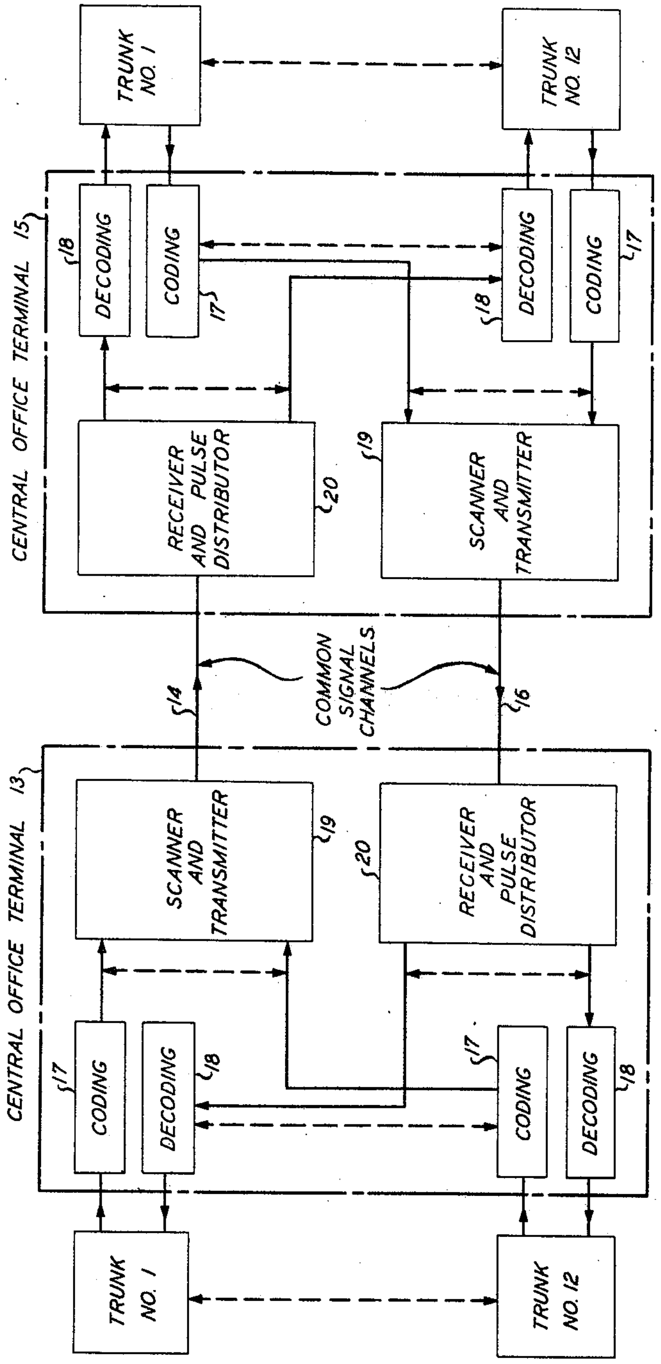
FIG. 1 is a block diagram of a 12-channel telephone transmission system which uses a common signaling channel for the transmission of signaling information in each direction.

In the telephone transmission system illustrated in FIG. 1 telephone service is provided for twelve trunks between central office terminals 13 and 15. FIG. 1 illustrates only that portion of the circuitry associated with each channel that is relevant to the transmission of signaling information between the central offices.

Transmission of signaling information originates in one direction from trunks 1 through trunks 12 associated with central office terminal 13, is processed through central office terminal 13 and is then directed over common signaling channel 14 through central office terminal 15 to terminate in trunks 1 through 12 associated with central office terminal 15. Transmission of signaling information in the opposite direction, on the other hand, originates from trunks 1 through 12, associated with central office terminal 15, is processed in central office terminal 15, and is then directed over common signaling channel 16, through central office terminal 13 to terminate in trunks 1 through 12, associated with central office terminal 13.

Each central office terminal, in turn, includes twelve coding networks 17 and twelve decoding networks 18, one each of which is associated with a respective channel. Each coding network receives its input from a respective trunk and directs its output to scanner and transmitter 19, which is associated with the respective central office terminal. Each decoding network, on the other hand, receives an input from receiver and pulse distributor 20 at the respective central office terminal and directs its output to a respective trunk.

In the operation of the telephone transmission system of FIG. 1 the voice messages for each of the trunks are directed over individual channels of the transmission facilities between the central office terminals. The signaling information for the individual channels, on the other hand, is sent over a common signaling channel 14 of the transmission facilities from central office terminal 13 to central office terminal 15 and over common signaling channel 16 of the transmission facilities from central office terminal 15 to central office terminal 13.

In order to provide for the transmission over a common signaling channel of all signaling information directed from one central office terminal to another central office terminal, the signaling information for each channel is converted in a respective coding network 17 into a coded pulse group. As a result, each of the coding networks 17 has at any one instant as an output one of these coded pulse groups, where a specific coded pulse group corresponds to the signaling condition of a respective channel at that particular time. Scanner and transmitter 19 combines all of these individual coded pulse groups by periodically sampling the output of each coding network 17, and by allowing at the time of scanning the transmission over the common signaling channel of the individual coded pulse groups which are associated with each channel. That is, during each scanning interval a transmission of twelve coded pulse groups is repeated over the common signaling channel. When transmission takes place, for instance, from central office terminal 13 to central office terminal 15, the coded pulse groups are transmitted over common signaling channel 14. When, on the other hand, transmission takes place from central office terminal 15 to central office terminal 13, the coded pulse groups are transmitted over common signaling channel 16.

At the respective receiving office terminal the coded pulse groups are directed to receiver and pulse distributor 20. In receiver and pulse distributor 20 the individual coded pulse groups are distributed to the receiving channels which correspond to respective transmit channels to be directed to individual decoding units 18 in which the coded pulse groups are processed and reconverted to dial pulsing signals. The signaling information that is thereby generated is then sent to the corresponding trunk to perform the switching functions that correspond to the signaling condition at the transmit channel at the time of the scanning.

In order for the telephone transmission system of FIG. 1 to transmit over its common signaling channels 14 and 16 a two-binary-digit coded pulse group for each of its twelve channels, for instance, it is necessary that twelve two-binary-digit pulse groups, or 24 bits, are sent every sampling period. If an 80 millisecond sampling interval has been provided for in the transmission system, for instance, every 80 milliseconds 24 bits must be transmitted over the respective common signaling channel. The required common signaling channel bit capacity is, therefore, 300 bits per second.

Figure 2:
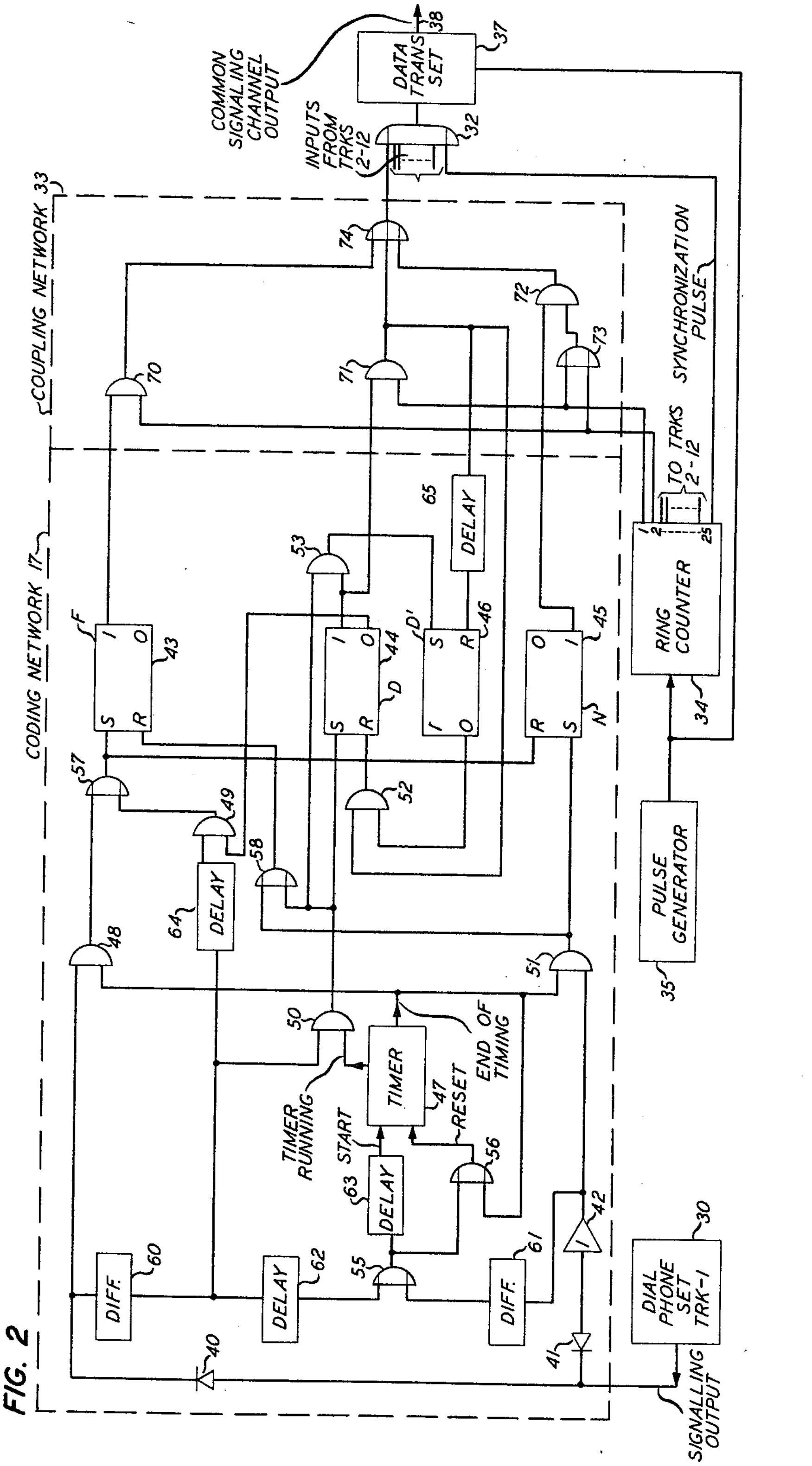
FIG. 2 is a block diagram illustrating the coding and scanning equipment at the transmit terminal in an embodiment of the invention.

FIG. 2 is a block diagram illustrating the coding and scanning equipment at the transmit terminal in an embodiment of the invention in which the signaling condition for each channel is coded into two-binary-digit pulse groups. That is, each of the standard signaling conditions of on-hook, off-hook, and dial pulse are assigned specific two-binary-digit coded pulse groups. FIG. 5 shows a tabulation of one specific two-binary-digit code that may be used in the embodiment of the invention of FIGS. 1 and 2.

In FIG. 2, the signal information for a specific trunk is generated in dial telephone set 30 and supplied to a coding network 17. In coding network 17 the specific signaling information is converted to coded pulse groups of the type illustrated in FIG. 5. The coded pulse groups are coupled from coding network 17 to OR gate 32 through a coupling network 33 in response to a scanning signal from ring counter 34. Ring counter 34, which receives its pulse input from pulse generator 35, supplies gating signals to coupling network 33 of trunk 1, to similar coupling networks of trunks 2 through 12, and to OR gate 32. In OR gate 32 the coded pulse groups for the individual channels are summed to be transmitted through data transmit set 37 over common signaling channel 38 of the transmission facilities to the receiving central office terminal. Data transmit set 37 operates on the coded pulse group data to permit its transmission over the common signaling channel of the telephone transmission facilities. Data transmit set 37 may, for instance, be generally of the type that has been described in an article entitled "An FM Data Set for Voiceband Data Transmission" by S. J. Meyers on page 2 of the January 1963 issue of the Bell Laboratories Record.

In a typical dial pulsing system the signaling information is generated at the dial telephone set in the form of a varying D-C level. One level corresponds to an on-hook condition and another different level corresponds to an off-hook condition. Dial pulses, on the other hand, are generated by the rotation of the dial on the dial telephone set, which rotation actuates a cam to produce trains of dial pulses, where the dial pulses are represented by alternate on-hook and off-hook levels which are switched at the dial rate. FIG. 6 shows typical dial pulsing signals, the corresponding binary-digit-code, and the signaling symbols used in the description of the telephone transmission system of the present invention.

The signaling information as shown in FIG. 6 and as generated in dial telephone set 30 of FIG. 2 is applied to the coding network 17 to be converted into appropriate coded pulse groups. The output of dial telephone set 30 is coupled into coding network 17 either through diodes 40 or 41, depending upon the D-C level of the dial signal. That is, positive going dial signals are passed through diode 40, whereas negative going dial signals are passed through diode 41 and are inverted to the proper polarity in inverter 42. The output elements of coding network 17 are bistable multivibrators 43, 44, and 45. Bistable multivibrators 43, 44, and 45. Bistable multivibrator 46, on the other hand, is used to store a dial pulse condition until a previous dial pulse condition has been transmitted over the common signaling channel in the case where two dial pulses occur within one scanning interval.

The bistable multivibrators 43 through 46 are of the type that have two stable output states "1" and "0" which are obtained by either applying a "set" or a "reset" input pulse, respectively. The respective stable output states are maintained until another input pulse is applied which commands the bistable multivibrator to change to an opposite stable output state.

A "set" pulse applied to the individual bistable multivibrators 43, 44, or 45 produces a respective "1" output which corresponds to an off-hook (F), dial pulse (D), or on-hook (N) signaling condition, respectively. The respective outputs of bistable multivibrators 43 through 45 are "set" in response to the dial signals from dial telephone set 30 as processed in the coding network 17 which comprises, in addition, a timer 47, AND gates 48 through 53, OR gates 55 through 58, differentiators 60 and 61, and delay units 62 through 65. Timer 47 has a 130 millisecond timing cycle, where this period has been chosen to satisfy the general system requirements which will become apparent as the operation of the system is further described. During the duration of each timing cycle the timer puts out a constant level "timer running" voltage and, at the end of each timing cycle, the timer puts out an "end of timing" trigger pulse. The constant level "timer running" voltage is used to enable AND gate 50, whereas the "end of timing" trigger pulse is used to activate bistable multivibrators 43 and 45. A reset pulse applied to the reset input of timer 47 during a timing cycle terminates the particular timing cycle and readies the timer for another timing cycle. Timer 47 may be any one of a variety of timing devices well known in the art such as, for instance, a 114 stage shift register that is driven by a 1000 hertz clock and which provides for a "timer running" output during the shift operation and an "end of timing" trigger pulse when reaching the 114th stage. In addition, a reset input provides for the resetting of all of the shift register stages.

Delay units are inserted in the respective signal paths to provide for the required pulse delays as pointed out in the following circuit description. Delay units which may be used in the embodiment of the invention are well known in the art and may, for instance, be of the type that has been generally described in chapter 10 of Millman & Taub, Pulse and Digital Circuits, McGraw-Hill, 1956. The respective outputs of the bistable multivibrators 43 through 45 are coupled to common signaling channel 38 via OR gate 32 and data transmit set 37 through a coupling network 33 which comprises AND gates 70, 71, and 72 and OR gates 73 and 74.

The generation of the coded pulse groups is made possible by applying to AND gates 70, 71, and 72 a scanning output from ring counter 34. FIG. 7 shows the input pulse train to ring counter 34 and the resulting distribution of two pulses to each channel and one synchronization pulse to OR gate 32 per scanning cycle. The two respective channel pulses are distributed to AND gates 70, 71 and 72 of coupling network 33 to formulate the coded pulse groups which convey the signaling condition of the respective channel. In FIG. 2 only the first pulse of the two ring counter output pulses for this channel is applied to AND gate 71 and only the second pulse is applied to AND gate 70, while both of the pulses are applied through OR gate 73 to AND gate 72.

At any one particular time each channel can only be in one of the standard signaling conditions, so that at each sampling time of the channel only one of the bistable multivibrators 43, 44, or 45 can be in the "set" condition. If, for instance, bistable multivibrator 43 is in the "set" mode, that is the channel is in an off-hook signaling condition, AND gate 70 is enabled so that during the next scanning interval the second output pulse of ring counter 34 is allowed to pass through AND gate 70 and OR gate 74, thereby transmitting a "01" pulse group. Similarly, if the channel is in a dial pulse condition, so that bistable multivibrator 44 is set, only the first output pulse of ring counter 34 is transmitted through AND gate 71 and OR gate 74 to generate a "10" pulse group. When bistable multivibrator 45 is set, on the other hand, corresponding to an off-hook signaling condition, the first and the second output pulses of ring counter 34 are allowed to be transmitted through AND gate 72 and OR gate 74 to generate a "11" pulse group. If at any particular scanning interval neither one of bistable multivibrators 43, 44, and 45 is set, none of the scanning pulses are allowed to pass through coupling network 33, so that a "00" pulse group will be transmitted to indicate a "no action" signaling condition. OR gate 32 has as its inputs the coded pulse groups from channels 1 through 12, as well as the synchronization pulses. The synchronization pulses are derived from ring counter 34 and consist of every 25th ring counter output pulse.

FIG. 4, lines A through E, illustrates the operation of the circuits of FIG. 2. FIG. 4, line A, shows typical dial pulsing signals as they are generated in dial telephone set 30. At time $t_0$ of FIG. 4 the system is turned on, thereby resetting timer 47 and bistable multivibrators 43 through 46 of FIG. 2. If it is assumed that at the time of turn-on dial telephone set 30 is in the on-hook condition, an on-hook signal is generated at that instant. Since the on-hook signal is a negative going signal, it is blocked by diode 40 but passed by diode 41, inverted by inverter 42, and applied to AND gate 51 and differentiator 61. The output of differentiator 61 is applied through OR gate 55 and delay unit 63 to timer 47 to start its timing cycle.

During the duration of each timing cycle the timer puts out a constant level "timer running" signal and, at the end of each timing cycle, the timer puts out a short "end of timing" pulse. The first "end of timing" output pulse of time 47 occurs at time $t_1$, i.e., at the end of the first timing cycle shown on line B of FIG. 4. This timer output pulse is applied to AND gate 51 and is also used to reset timer 47 through OR gate 56. Dial telephone set 30 is, at this time, still in the on-hook condition, thereby enabling AND gate 51, so that the "end of timing" output of time 47 is allowed to pass through AND gate 51 to "set" bistable multivibrator 45. As a result of this "set" input bistable multivibrator 45 is put into the "1" output state which corresponds to an on-hook (N) signaling condition of the channel. The output of bistable multivibrator 45, in turn, is used to enable AND gate 72. FIG. 4, line B, shows the operation of timer 47, and FIG. 4, line C, indicates the setting of bistable multivibrator 45 corresponding to an "N" output at the end of the timing cycle at time $t_1$.

During the remaining idle period from time $t_1$ to time $t_2$ of FIG. 4, the dial telephone set remains in an on-hook condition, so that no further action occurs in coding network 17 and, consequently, bistable multivibrator 45 remains in a "set" condition during this period. The output of bistable multivibrator 45, in turn, applies an enabling pulse to AND gate 72 which allows the transmission of a "11" pulse group for each scanning cycle during period $t_1$ to $t_2$ as indicated by the symbols "N" in line D of FIG. 4 for the interval from time $t_1$ to time $t_2$.

In the operation of the telephone transmission system of FIG. 2 the signaling condition of dial telephone set 30 changes at time $t_2$ to an off-hook condition. Since the off-hook signal is a positive going pulse, it is blocked by diode 41 but passed on by diode 40 to be differentiated in differentiator 60. The resulting output pulse of differentiator 60 is applied through delay unit 64 at one input of AND gate 49. The other input of AND gate 49 is an enabling voltage which is derived from the "0" output of bistable multivibrator 44, where bistable multivibrator 44 is at this time in the reset state. The pulse that is generated by differentiator 60 at time $t_2$ in response to the change to the off-hook signaling condition is therefore coupled through AND gate 49 and OR gate 57 to "set" bistable multivibrator 43 and to "reset" bistable multivibrator 45 as indicated for time $t_2$ in line C of FIG. 4.

Timer 47 is also activated by the output of differentiator 60 through delay units 62 and 63 and OR gate 55. Because of this delayed activation of timer 47, the "timer running" voltage does not enable AND gate 50 until after the output pulse of differentiator 60 has subsided, thereby preventing this pulse from passing through AND gate 50. In addition, since multivibrator 43 has already been activated almost immediately after the signaling change at time $t_2$, the "end of timing" pulse output of timer 47 at the end of the timing cycle which started at time $t_2$ has no further effect.

The setting of bistable multivibrator 43 causes its "1" output to be applied to AND gate 70 to enable it. As a result, AND gate 70 is allowed to pass each second pulse of the respective two-pulse ring counter output during each scanning period for this channel, so that "01" pulse groups corresponding to the off-hook (F) signaling condition are generated. At each scanning interval following time $t_2$ a "01" pulse group (F) is therefore sent for channel 1 as shown in FIG. 4, line A, until a change in signaling condition causes a change in the coded pulse group.

During the off-hook period starting at time $t_2$, the trunk is connected into the system and at some time $t_3$, for instance, dialing may be started. The beginning of a first dialed digit is indicated by a negative going signal pulse, or an on-hook signal level, as shown to commence at time $t_3$ of FIG. 4, line A. In the circuitry of FIG. 2 this negative going pulse is passed by diode 41, inverted in inverter 42, and differentiated in differentiator 61. The output pulse of differentiator 61, in turn, is applied through OR gate 55 and delay unit 63 to timer 47 to start a new timing cycle at time $t_3$. During the time that timer 47 is running, that is during the timing interval, the "timer running" signal enables AND gate 50, so that, when another pulse is applied to the other input of AND gate 50 during this enabling interval, the other pulse is able to pass through the AND gate.

While timer 47 is still running, the second part of the first digit of the dial signal starts; that is, at time $t_4$ the signaling level returns to the off-hook level with a resulting positive going change of the signaling voltage. This positive going change in signal voltage is again passed through diode 40 to be differentiated in differentiator 60 and to be applied to the second input of AND gate 50. Since at this time the timer is still running AND gate 50 is still enabled, so that the output pulse of differentiator 60 is allowed to pass through AND gate 50 to "set" bistable multivibrator 44, and to "reset" bistable multivibrator 43 through OR gate 58. As a result, AND gate 71 becomes enabled, while AND gate 70 becomes disabled.

The output of differentiator 60 is, in addition, applied to the reset input of timer 47 through OR gates 55 and 56 and through delay unit 62 to reset the timer. The output of OR gate 55 is also applied through delay unit 63 to the start input of timer 47 to start a new timing cycle at approximately time $t_4$, after the timer has been reset. It is important to notice that the resetting of timer 47 is sufficiently delayed by delay unit 62 until after such time that the output of differentiator 60 has been allowed to pass through AND gate 50 to set bistable multivibrator 44. The setting of bistable multivibrator 44, in turn, also removed the enabling pulse from AND gate 49, so that the differentiated output of differentiator 60 which has been delayed through delay unit 64 is blocked by AND gate 49.

When at time $t_5$ the second digit of the dialing signal is started, the resulting negative going signal voltage is passed through diode 41, inverted in inverter 42, differentiated in differentiator 61, and passed on through OR gates 55 and 56 to reset timer 47, and is also allowed to go through delay unit 63 to subsequently restart the timing cycle.

During this period after time $t_4$ the output of bistable multivibrator 44 has been coupled to AND gate 71 to enable it. At the next scanning interval after time $t_5$, the first pulse of the respective two output pulses of the ring counter for this channel is therefore allowed to pass through AND gate 71. Since all other bistable multivibrators are in the reset mode at this time, a "10" pulse group will be sent during this scanning interval over common signaling channel 38 from AND gate 71 through OR gates 74 and 32 and data transmit set 37.

The output of AND gate 71 is also applied to one input of AND gate 52 which is still enabled by the "0" output from bistable multivibrator 46. As a result, bistable multivibrator 44 will automatically be reset at the time of scanning by the output from AND gate 71 through AND gate 52. Bistable multivibrator 44 has thus been reset and is therefore enabled again to be ready for use when the second portion of the second dial digit starts at $t_6$. That is, when the signal level goes to off-hook at time $t_6$, this change in signal level is again able to "set" bistable multivibrator 44 in the same manner as described for the first digit, with a resulting subsequent transmission of a dial pulse message.

At time $t_6$ an interdigital interval starts, where such interdigital interval is always greater than 130 milliseconds. As a result, the timer which started a new timing cycle at time $t_6$ is allowed to run the full 130 millisecond period, since no change in signaling level occurs before the end of the timing cycle. Before the end of the timing cycle, however, another scanning interval is reached which allows the transmission of the previously generated dial signal or pulse group "10." The transmission of this pulse group again resets bistable multivibrator 44 to ready it for another dial pulse. At the end of the timing cycle at time $t_7$ timer 47 puts out its "end of timing" pulse which sets bistable multivibrator 43 through AND gate 48 and OR gate 57; AND gate 48 is allowed to pass the "end of timing" pulse since the continuing off-hook signaling condition maintains AND gate 48 enabled. As a result, off-hook (F) pulse groups, of "01" will be generated at AND gate 70 during the scanning cycles following time $t_7$, since AND gate 70 receives in addition to the enabling input from multivibrator 43 a second input, namely the second channel pulse from ring counter 34. The output of AND gate 70 is then coupled through OR gates 74 and 32 and through data transmission set 37 to be transmitted over common signaling channel 38. Transmission of the "01" pulse group corresponding to the off-hook signaling condition continues during the interdigital interval until the next dial pulse resets the dial pulse bistable multivibrator 44.

The next dial pulse signal starts at time $t_8$, resulting in a new timing cycle. As illustrated in FIG. 4, line B, the first portion of the first digit started at time $t_8$ comes to an end at time $t_9$, just after another scanning cycle took place. This positive going voltage of the dial pulse results in the setting of bistable multivibrator 44 at time $t_9$ in the same manner as described with reference to the first dial pulse sequence that started at time $t_3$.

During the off-hook level of the first digit after time $t_9$ timer 47 runs again to be reset and restarted at time $t_{10}$ when the on-hook portion of a second dial pulse digit starts. This operation which neither sets nor resets any of the bistable multivibrators is identical to the sequence described during the previous dial pulse sequence. The first portion of the second digit, that is, is the on-hook level which is started at time $t_{10}$, comes to an end at time $t_{11}$ with a resulting change to the off-hook level This change in level, however, occurs before another scanning cycle has bbeen reached, so that bistable multivibrator 44 which has been set by the first digit of the second dial pulsing sequence is still in a set mode. In order to preserve the second dial pulse information until after the first dial pulse coded pulse group has been transmitted, bistable multivibrator 46(D′) must be placed in the "set" mode, so that at time $t_{11}$ both multivibrators 44 and 46 are in a "set" mode. FIG. 4, line C, illustrates this condition by showing a D and D′ in a set mode for time $t_{11}$. The "setting" of bistable multivibrator 46 is made possible since bistable multivibrator 44, which is still in a "set" mode at time $t_{11}$, applies its output as an enabling pulse to AND gate 53. As a result, the pulse output from AND gate 50, which normally would set bistable multivibrator 44, is now allowed to pass through AND gate 53 to set bistable multivibrator 46 instead. The setting of bistable multivibrator 46, in turn, removes the enabling pulse from AND gate 52, so that, when at the next following scanning interval just after time $t_{11}$ a dial pulse coded pulse group is passed through AND gate 71, the output of AND gate 71 is not allowed to pass through AND gate 52 to reset bistable multivibrator 44. As a result, even though a dial pulse coded group has been sent, bistable multivibrator 44 is not being reset but remains instead in the set mode, so that during the next scanning interval at time $t_{12}$ another dial pulse pulse group may be transmitted.

The output of AND gate 71 at the scanning interval immediately following time $t_{11}$, however, is also applied in delayed form through delay unit 65 to the reset input of bistable multivibrator 46, resetting it after the delay period of delay unit 65. With bistable multivibrator 46 in the reset mode, an enabling pulse is again applied to AND gate 52. However, this enabling pulse is not available until after the delay of delay unit 65, at which time the first dial pulse coded pulse group has already been transmitted, thereby preventing the resetting of bistable multivibrator 44 through AND gaate 52 by this first dial pulse coded pulse group. Consequently, even though bistable multivibrator 46 has been reset, bistable multivibrator 44 remains in a set mode even after the sending of the pulse group representing the first dial pulse, so that at the next scanning interval at time $t_{12}$ the other coded pulse group corresponding to the second dial pulse may be transmitted through AND gate 71 to be passed on to the common signaling channel. This next succeeding output of AND gate 71 is then again applied through AND gate 52 to bistable multivibrator 44 to reset it at this time, so that another later dial pulse can be properly processed.

In the dialing signal example illustrated in FIG. 4, however, another interdigital interval is started at time $t_{11}$. Because of the long duration of this interval, timer 47 is allowed to run the full 130 millisecond period with the resulting setting of bistable multivibrator 43 just after time $t_{12}$, so that an off-hook coded pulse group may be sent at the next scanning interval following time $t_{12}$.

In the signaling example of FIG. 4 another set of dialing pulses is started at time $t_{13}$. The on-hook part of the first digit terminates just prior to a scanning interval, so that a resulting dial pulse message is sent at this next scanning interval at time $t_{14}$. The interval between this first digit and the next digit, however is stretched out to such an extent that bistable multivibrator 44 does not become set again until time $t_{16}$, which is after the next following scanning interval that takes place at time $t_{15}$. Since neither bistable multivibrator 44 nor any one of the other bistable multivibrators of coding network 17 is set at that particular time, i.e., at time $t_{15}$, the respective two channel pulses from ring counter 34 are blocked from transmission, so that a "00" pulse group is transmitted at the scanning interval at time $t_{15}$, where the "00" pulse group indicates that no change in signaling condition has taken place. However, in the next scanning interval just following time $t_{16}$, a coded pulse group corresponding to a dial pulse will be sent which is followed with another series of off-hook pulse groups, since at time $t_{16}$ another interdigital interval has been started.

In the operation of the coding network of FIG. 2 a scanning interval of 80 milliseconds has been chosen to accommodate dial pulses occurring at a rate of 12½ pulses per second. The timing period of the timer, on the other hand, has been set at 130 milliseconds so that only off-hook levels which constitute interdigital intervals or end-of-dialing conditions, both of which exceed 130 milliseconds, are counted and transmitted as off-hook signals.

Another signaling condition that the telephone trunk system must be able to cope with is the re-ring function. A re-ring signal is received only when an originating operator desires to attract the attention of a terminating operator after a connection has been established. Thus, to the basic off-hook and on-hook states and the dial pulses, another re-ring state consisting of a short pulse of the on-hook state has been added. By making use of time, a re-ring signal may be readily recognized and transmitted. That is, since a re-ring signal occurs only during a connect period (off-hook), it may be conveyed in the form of a simple dial pulse, which may then be recognized as a re-ring signal because of its occurrence in time with respect to other signaling conditions.

A re-ring signaling condition is illustrated in FIG. 4, starting at time $t_{18}$. During the time interval of the break shown at time $t_{17}$ the dialing has been completed and the off-hook condition following the break corresponds to a completed trunk connection. At time $t_{18}$ the re-ring signal is initiated, causing timer 47 of FIG. 2 to start its timing cycle. When at time $t_{19}$ the re-ring signal is completed, the positive-going voltage is differentiated in differentiator 60, the output pulse of which is applied to AND gate 50. Since AND gate 50 is at this time enabled by the "timer running" voltage, the output of differentiator 60 is allowed to pass through AND gate 50 to set bistable multivibrator 44, which results in the transmission of a dial pulse coded pulse group during the scanning interval just following time $t_{19}$. The output of differentiator 60 also restarts timer 47 after some delay caused by delay units 62 and 63, which eventually results in the resetting of bistable multivibrator 43 and the subsequent transmission of off-hook pulse groups. Such a dial pulse coded pulse group transmitted between long off-hook periods will be recognized by the receiving equipment as a re-ring signal because of this time relationship.

As a result of the action at the transmit terminal a series of two-binary-digit coded pulse groups is thus transmitted over the common signaling channel in response to the various signaling conditions originating at the dial telephone sets of the several trunks at the transmit end. Each one of the two-binary-digit coded pulse groups is an indication of the signal condition of one particular channel at the instant of scanning, where each channel scan is repeated every 80 milliseconds. The two-binary-digit coded pulse groups generated for the individual channels are summed in OR gate 32 and are transmitted through data transmit set 37 over common signaling channel 38 to the receiving central office. In order to provide for proper synchronization of the transmitted signal, the 25th output pulse of the 25 pulse output ring counter is also applied through OR gate 32 to data transmit set 37. The synchronization pulse is thereby added to the series of coded pulse groups that are transmitted to the receiving central office terminal.

Figure 3:
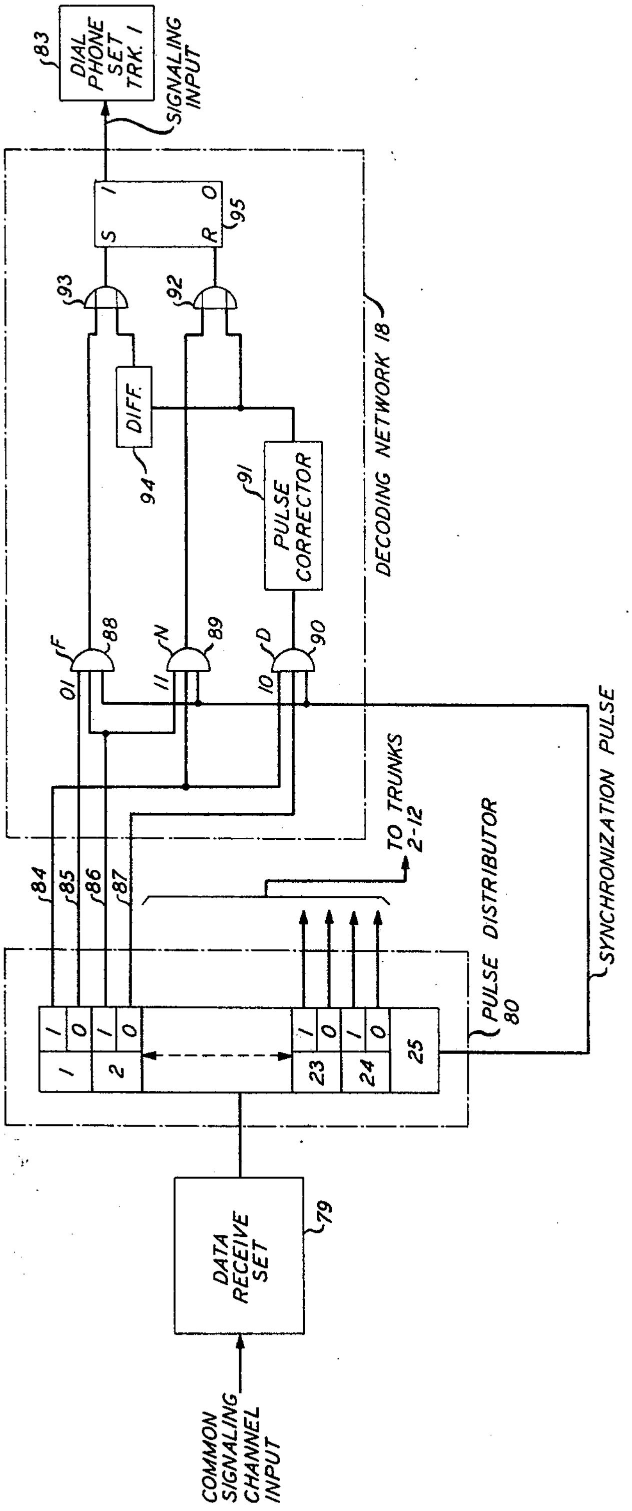
FIG. 3 shows the pulse distributing and decoding equipment at the transmit terminal in an embodiment of the invention.

The coded pulse groups, together with the synchronization signal, that are transmitted by the circuitry of FIG. 2 over the common signaling channel are received by the telephone transmission system receiving equipment that is illustrated in FIG. 3. The coded pulse groups which together with the synchronization pulses are sent over the common signaling channel are received and processed in a data receive set 79 and are fed as a series of pulses to pulse distributor 80, which in turn distributes the respective coded pulse groups to the proper receiving channels and which directs the synchronization pulses to AND gates 88, 89, and 90. The coded pulse groups for a particular channel are decoded in individual decoding networks 18, to finally operate the dial telephone set that is associated with the respective channel. In FIG. 3 the output for channel 1 from pulse distributor 80 is fed through a decoding network 18 to operate dial telephone set 83 in response to the signal condition originating at the transmit end of trunk 1. Duplicate decoding networks which are not shown in FIG. 3 are required to process the signaling information for the remaining channels 2 through 12.

In the operation of the receiving equipment illustrated in FIG. 3 the series of two-binary-digit coded messages and the synchronization pulse are applied to pulse distributor 80 through data receive set 79, where data receive set 79 operates on the signaling information transmitted over the common signaling channel to re-convert it into corresponding coded binary pulse groups. Data receive set 79, may, for instance, be generally of the type that has been described in an article entitled "An FM Data Set for Voiceband Data Transmission," by S. T. Meyers, on page 2 of the January 1963 issue of the Bell Laboratories Record.

Pulse distributor 80, on the other hand, may comprise a shaft register well known in the art. Pulse distributor 80 supplies two digits for each one of the twelve channels of the telephone transmission system and one digit as synchronization pulse to AND gates 88, 89, and 90. That is, pulse distributor 80 supplies a total of 25 digits as indicated by numerals 1 through 25 shown on pulse distributor 80 of FIG. 3, where digits one and two of pulse distributor 80 are the digits for trunk 1, whereas digits three through twenty-four are the digits for trunks 2 through 12, and digit twenty-five is the synchronization pulse. The particular outputs of pulse distributor 80 retain their specific output states during each scanning cycle until after the synchronization pulse has been transmitted, after which they are reset in accordance with the subsequently received coded pulse groups. However, each one of the 24 digits supplied to the individual trunks may be either a "one" or a "zero," so that pulse distributor 80 has four outputs for each channel. Output lines 84 through 87 are derived from digits 1 and 2 and correspond to the four output lines for channel 1. Since either of the first 24 digits may be either a "zero" or a "one," pulse distributor 80 has a total of forty-nine outputs; that is, two outputs per digit one through twenty-four or a total of four outputs for each channel, plus the synchronization output.

In FIG. 3 output lines 84 through 87 correspond to the outputs for channel 1 and are directed to decoding network 18, which comprises AND gates 88, 89, 90, pulse corrector 91, OR gates 92 and 93, differentiator 94, and output bistable multivibrator 95. Only one of AND gates 88, 89, and 90 has an output at one particular time depending on whether the signaling condition is either off-hook, on-hook, or dial pulse, respectively; that is, only one AND gate is enabled at a time, where AND gates 88, 89, and 90 receive their enabling inputs from pulse distributor 80 through lines 84 through 87. A third common input from pulse distributor 80 furnishes a pulse once every scanning cycle, which pulse is allowed to pass through the one AND gate that is enabled at the particular scanning time, thereby activating the following decoding network circuitry. The output of AND gate 88 is used to set bistable multivibrator 95 through OR gate 93, as a result of which an output signal is applied to dial telephone set 83. The output of AND gate 89 is applied through OR gate 92 to the "reset" input of bistable multivibrator 95. The output of AND gate 90 is applied to pulse corrector 91, the output of which, in turn, is applied through OR gate 92 to the "reset" input of bistable multivibrator 95 as well as through differentiator 94 and OR gate 93 to the "set" input of bistable multivibrator 95. Pulse corrector 91 functions to generate 100 millisecond pulses in response to each dial pulse coded pulse group that is received. The pulses generated by pulse corrector 91 are either automatically terminated after 100 milliseconds, or they are terminated and another 100 millisecond pulse is started after a minimum delay when a subsequent dial pulse coded pulse group is received before the initial 100 milliseconds are up. Pulse corrector 91 may, for instance, be generally of the type that has been described in an article entitled "An Electronic Pulse Corrector for D-C Dialing Circuitry" by R. V. Burns and R. T. Cleary on pages 549 through 551 of the AIEE Transaction, volume 81, part 1, January 1963.

When, in the operation of the telephone transmission system, dialing conditions as depicted in FIG. 4, line A, are encountered for channel 1, for instance, and corresponding coded pulse groups as shown in FIG. 4, line D, are received in the receiving terminal of FIG. 3, the coded pulse groups activate outputs 84 through 87 of pulse distributor 80 in accordance with the instantaneous transmitted signaling condition at the originating trunk. The outputs of lines 84 through 87 enable only one specific AND gate 89 receives a short pulse input from output enabled AND gate is released once during each scanning cycle by the application of the synchronization pulse.

From time $t_0$ to time $t_2$ of FIG. 4 an on-hook signaling condition exists in trunk 1 with the resulting pulse group of "11"(N) being transmitted from time $t_1$ to time $t_2$ for trunk 1. That is, the first digit as well as the second digit of channel 1 pulse group is a "one." The coded pulse group is received in data receive set 79 and directed to pulse distributor 80 to activate output lines 84 and 86, corresponding to the "11" pulse group. Outputs 84 and 86 of pulse distributor 80 are both directed to AND gate 89, thereby enabling only AND gate 89, since no other AND gate receives the required two enabling pulses. During the synchroniztion pulse interval AND gate 89 receives a short pulse input from output 25 of pulse distributor 80, which pulses is then passed through the enabled AND gate 89 and through OR gate 92 to reset bistable multivibrator 95, thereby removing the energization input from dial telephone set 83.

After the signal returns to the off-hook condition at time $t_2$, pulse groups "01"(F) are being transmitted and received in pulse distributor 80. As a result an enabling output is generated on lines 85 and 86 of pulse distributor 80 for code "01" pulse group, thereby enabling AND gate 88, which therefore allows the next synchronization pulse after each pulse group to pass through to set bistable multivibrator 95 through OR gate 93, thereby applying an input pulse to dial telephone set 83. Bistable multivibrator 95 thus remains set as long as a coded pulse group corresponding to an off-hook signaling condition is received.

When the first digit of a dial pulse is dialed, a pulse group "10"(D) is sent at the scanning interval immediately following time $t_5$. The "10" pulse group results in an output of lines 84 and 87 of pulse distributor 80, thereby enabling AND gate 90 to activate pulse corrector 91 at the time of the synchronization pulse. Pulse corrector 91 starts at that instant a 100 millisecond pulse which pulse is applied through OR gate 92 to reset with its leading edge bistable multivibrator 95, thereby removing the output pulse from dial telephone set 83. The output pulse of pulse corrector 91 is also processed through differentiator 94 to produce a trigger pulse that corresponds in time to the termination of the output pulse of the pulse corrector. This trigger pulse is applied through OR gate 93 to the "set" input of bistable multivibrator 95 to again generate an input for dial telephone set 83. As a result of the "reset" and "set" sequence of bistable multivibrator 95 in response to the pulse corrector output as triggered by the dial pulse coded pulse group, a dial pulse has been generated in dial telephone set 83. One important feature of this system is the automatic termination of the dial pulse at the termination of the pulse corrector output, without requiring a command from the transmit central office. When during the course of a dial pulse transmission a subsequent dial pulse follows another dial pulse before the termination of the 100 millisecond output pulse of pulse corrector 91, the output pulse of the pulse corrector is terminated automatically and a new output pulse is started after a predetermined delay. The trailing edge of the terminated pulse is used to "set" bistable multivibrator 95, which in turn activates dial telephone set 83. After a sufficient delay to allow the activation of the dial set, the new pulse is started in pulse corrector 91. The new pulse is then used to generate another dial pulse input for dial telephone set 83.

During the dialing period following the first sequence of dial pulses, coded messages corresponding to the particular signaling conditions continue to be received and processed in the circuity illustrated in FIG. 3. If it is assumed that the dialing is completed during the break shown at time $t_{17}$ of FIG. 4, trunk 1 assumes after that time an off-hook condition corresponding to a completed connection. During the connect period, however, a re-ring signal is started at time $t_{18}$ of FIG. 4, line A, which results in the transmission of dial pulse coded pulse group "10" (D) as indicated in FIG. 4, line D, for the scanning interval just following time $t_{19}$. In the receiving equipment the pulse group "10" is processed as described previously for dial pulse transmissions, which results in a 100 millisecond pulse output from pulse corrector 91. This pulse, which activates bistable multivibrator 95, is recognized as a re-ring pulse because of its occurrence in time between long off-hook signaling conditions.

The present invention provides thus for a unique and simple dial pulsing system which may be utilized to send the signaling information for an entire multichannel telephone transmission system over a low bit capacity common signaling channel, and because of the inherent simplicity of the system it may be readily expanded to accommodate additional signaling requirements that may arise at a later time.

It is to be understood that the above-described arrangements are illustrative of the application of the principles of the invention. Numerous other arrangements may be devised by those skilled in the art without departing from the spirit and scope of the invention.

I claim:

1. A telephone transmission system comprising a plurality of transmitting and receiving channels interconnected by a common channel wherein each of said transmitting and receiving channels has signaling information indicative of on-hook, off-hook, and dial pulsing conditions transmitted therethrough which includes apparatus to transmit said signaling information in coded form over a narrow band, said apparatus comprising individual coding means connected to each of said transmitting channels to convert the signaling information transmitted on each respective transmitting channel into multibit binary coded words, each of said individual coding means including first word producing means for producing first multibit coded words in response to an on-hook condition on its said respective transmitting channel, second word producing means for producing second multibit coded words in response to an off-hook condition on its said respective transmitting channel, and third word producing means for producing third multibit coded words in response to dial pulses on its said respective transmitting channel, scanning means connected between each of said individual coding means and said common channel for periodically transmitting the binary coded words output from each of said coding means individually to said common channel, individual decoding means connected to each of said receiving channels for reconverting said binary coded words into respective on-hook, off-hook and dial pulse signals, and pulse distributing means connected between said common channel and each of said individual decoding means for transmitting the binary coded words to the individual decoding means corresponding to respective receiving channels.

2. A telephone transmission system as in claim 1 wherein said on-hook, off-hook, and dial pulse signals comprise a first D.C. voltage level indicative of on-hook condition and a second D.C. voltage level indicative of off-hook condition, each of said individual coding means includes a timer for measuring a predetermined time, and said third word producing means produces said third coded word in response to said first D.C. level on said respective transmitting channel for less than said predetermined time.

3. A telephone transmission system as in claim 1 wherein said third word producing means produces a single third coded word in response to each dial pulse on said respective transmitting channel and each of said individual decoding means includes dial pulse producing means for reconstructing a single dial pulse in response to each received third coded word.

4. A telephone transmission system as in claim 3 wherein each of said first, second and third word producing means includes a main binary store for storing an indication of the signaling condition of said respective transmitting channel, each of said main stores having a set state and a reset state, and an individual output corresponding to each of said states, said stores being interconnected to allow only one of said main stores of each coding means to be in said set state at any one time.

5. A telephone transmission system according to claim 3 wherein said third word producing means includes an auxiliary binary store interconnected with said main binary store of said third word producing means for storing an indication of a dial pulse which appears on said respective transmitting channel while a previous dial pulse indication is stored in said main binary store, and means for transferring said indication stored in said auxiliary binary store to said main binary store in response to the transmission of a third coded word.

6. A telephone transmission system in accordance with claim 3 in which said scanning means comprises a pulse generator, a ring counter having a plurality of outputs in response to pulse inputs from said pulse generator, said ring counter sequentially and continuously distributing the output pulses of said pulse generator to said plurality of outputs, means to divide said plurality of output pulses into a plurality of successive pulse groups each comprising an equal number of successive pulses, means to apply one each of said pulse groups to each of said coding means and including coupling means connected between said common channel and said main binary stores for selectively coupling the individual pulses of a respective pulse group to said common channel in response to the state of said main binary stores thereby allowing periodic transmission of pulse groups over said common channel, each successive pulse group giving an indication of said signaling condition of a corresponding transmitting channel.

7. A telephone transmission system in accordance with claim 6 in which each of said coupling means includes a plurality of AND gates, each having a plurality of inputs, a first input of each of said AND gates being connected to the output of an individual one of said binary stores corresponding to its respective set state, and means to selectively couple the pulses of a respective pulse group of said ring counter to said other inputs of said AND gates, thereby generating coded output pulses corresponding to the signaling condition of said respective channel.

8. A telephone transmission system in accordance with claim 7 in which said scanner output pulses are divided into pulse groups of two pulses each to be applied to respective channel coding means, said coding means comprising first, second and third main binary stores and first, second and third AND gates, said AND gates each having two inputs, said set state of said first second and third main binary stores corresponding to an off-hook, on-hook and dial condition, respectively, of said respective transmitting channels, said pulse group coupling means connecting a respective first pulse of a respective pulse group to the second input of said second and third AND gates, and coupling a respective second pulse to the second input of said first and second AND gates, thereby transmitting coded signaling information comprising two binary digit pulse groups for each of said transmitting channels over said common channel.

9. A telephone transmission system as in claim 8 wherein each of said decoding means includes a fourth AND gate responsive to said first coded words, a fifth AND gate responsive to said second coded words and a sixth AND gate responsive to said third code words, an output terminal, means for supplying said first voltage level at said output terminal in response to said fourth and sixth AND gate outputs, and means for supplying said second voltage level at said output terminal in response to said fifth and sixth AND gate outputs.

References Cited

UNITED STATES PATENTS

| | | | |
|---|---|---|---|
| 3,083,267 | 3/1963 | Weller | 179—15 |
| 3,134,859 | 5/1964 | Brightman | 179—18 |
| 3,271,521 | 9/1966 | Von Sanden et al. | 179—15 |

KATHLEEN H. CLAFFY, Primary Examiner

A. B. KIMBALL, Jr., Assistant Examiner

U.S. Cl. X.R.

179—15, 41